J. COCHRAN, Jr.

Improvement in Spinning-Wheels.

No. 129,459. Patented July 16, 1872.

Witnesses:
Chas. Nida
Geo. W. Mabee

Inventor:
J. Cochran Jr.
PER
Attorneys.

128,459

UNITED STATES PATENT OFFICE.

JAMES COCHRAN, JR., OF CORNWALLIS, NOVA SCOTIA.

IMPROVEMENT IN SPINNING-WHEELS.

Specification forming part of Letters Patent No. 129,459, dated July 16, 1872.

Specification describing a new and useful Improvement in Hand-Spinner, invented by JAMES COCHRAN, Jr., of Cornwallis, county of Kings, Nova Scotia.

The invention will first be fully described and then clearly pointed out in the claim.

Figure 1:
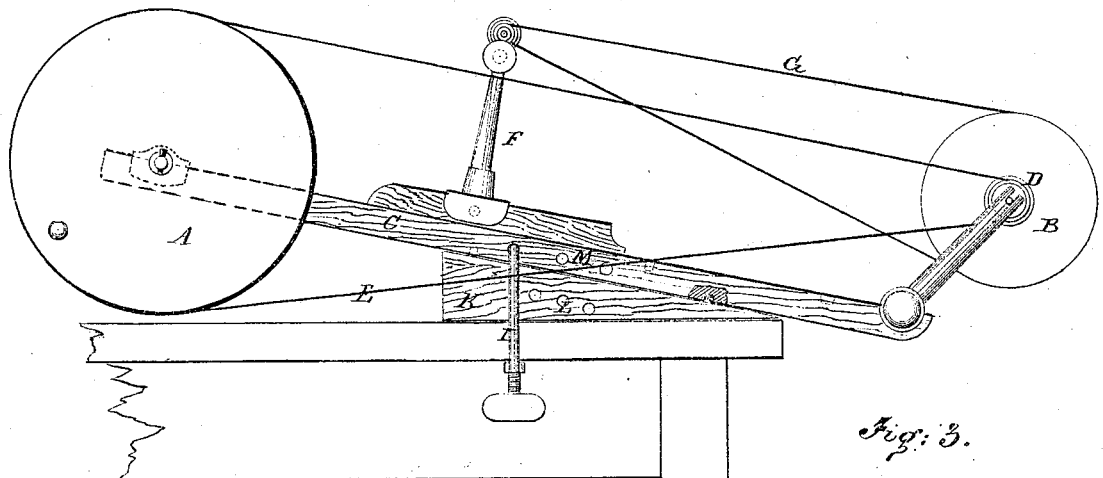
Figure 3:
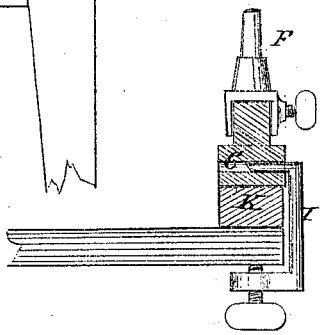
Figure 2:
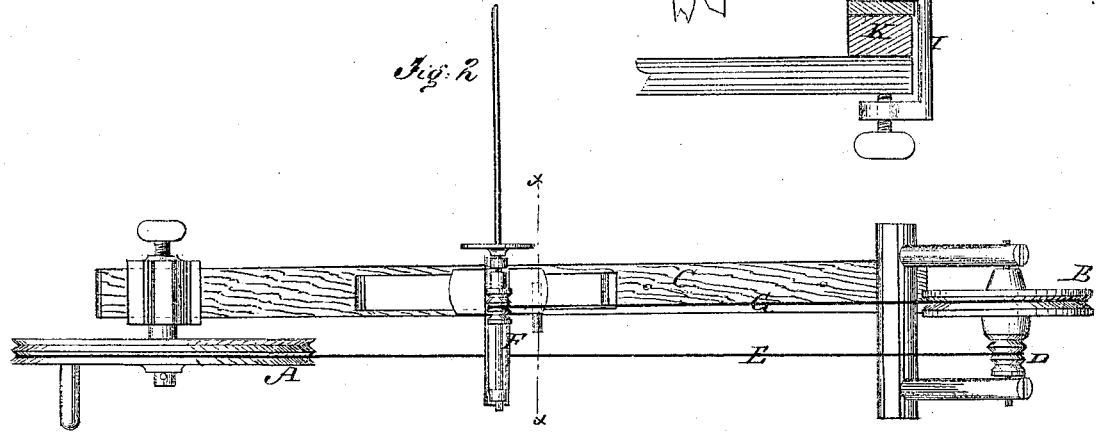

Figure 1 is a side elevation of my improved machine, showing it attached to the table for the operator to stand. Fig. 2 is a top view, and Fig. 3 is a transverse section on the line x x.

A is the driving-pulley, and B an intermediate multiplying pulley, mounted at the opposite ends of a support, C, the pulley B having a small grooved axle, D, on which a belt, E, works from the driver. F is the spindle-support, which is placed between the two driving-wheels near the main driver, and the spindle is worked by the belt G from the second driver B, thus allowing the use of long belts without having the spindle too far from the driver, so that the operators may both turn and spin; also allowing the use of small drivers and at the same time producing the requisite speed. The machine is held by a clamp, I, to the edge of the table with a wedge-shaped block, K, so placed under the support C that the driver A will be raised, as shown in Fig. 1, to be adjusted for the operator to stand. The block K has pins on its inclined side, which fit in holes in the under side of the support C to prevent slipping, and the upper end of the clamp is engaged with one of the holes M in the side of the support C. When adjusted for the operator to sit the support C is laid on the table with the block K placed on the top of it, the pins fitting, in this case, in holes in the upper side of the support, and the clamp being engaged at the upper end with one or the other of the holes I in said block, which is thus used so as to utilize the same clamp that is adapted for securing the machine when the block is placed under it.

Having thus described my invention, I claim as new and desire to secure by Letters Patent—

The support C of a hand spinning-machine, provided with perforations M in its side and with holes in its top and bottom, and combined with the clamp and screw I and the wedge K, constructed with the perforations L and the pins in its inclined side, as shown and described.

JAMES COCHRAN, JR.

Witnesses:
   J. R. HEA,
   CHARLES E. RATHBUN.